(12) United States Patent
Arimilli et al.

(10) Patent No.: US 8,756,270 B2
(45) Date of Patent: *Jun. 17, 2014

(54) COLLECTIVE ACCELERATION UNIT TREE STRUCTURE

(75) Inventors: Lakshminarayana B. Arimilli, Austin, TX (US); Bernard C. Drerup, Austin, TX (US); Paul F. Lecocq, Cedar Park, TX (US); Hanhong Xue, Wappingers Fall, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/454,727

(22) Filed: Apr. 24, 2012

(65) Prior Publication Data

US 2012/0296915 A1    Nov. 22, 2012

Related U.S. Application Data

(63) Continuation of application No. 12/749,100, filed on Mar. 29, 2010.

(51) Int. Cl.
*G06F 15/16* (2006.01)
*H04L 29/06* (2006.01)
*H04L 29/08* (2006.01)
*H04L 29/12* (2006.01)
*H04L 12/54* (2013.01)
*H04L 12/56* (2006.01)

(52) U.S. Cl.
CPC .......... *H04L 29/06* (2013.01); *H04L 29/08072* (2013.01); *H04L 29/08135* (2013.01); *H04L 29/12132* (2013.01); *H04L 29/12594* (2013.01); *H04L 12/56* (2013.01); *H04L 61/1552* (2013.01); *H04L 61/3015* (2013.01); *H04L 45/02* (2013.01); *H04L 45/123* (2013.01); *H04L 45/306* (2013.01); *Y10S 707/9994* (2013.01)
USPC ........... 709/202; 709/217; 709/221; 709/226; 712/22; 712/30; 712/221; 707/741; 707/E17.002; 707/999.01; 370/252; 370/392; 716/104; 716/126

(58) Field of Classification Search
USPC ........ 709/202, 226, 217, 221; 712/20, 22, 30, 712/221; 707/741, 999.01; 370/252, 392; 716/104, 126

See application file for complete search history.

(56) References Cited

U.S. PATENT DOCUMENTS

| | | | |
|---|---|---|---|
| 4,695,945 A | 9/1987 | Irwin | |
| 5,103,393 A | 4/1992 | Harris et al. | |
| 5,327,365 A | 7/1994 | Fujisaki et al. | |
| 5,353,412 A | 10/1994 | Douglas et al. | |
| 5,535,387 A | 7/1996 | Matsuoka et al. | |
| 5,752,067 A | 5/1998 | Wilkinson et al. | |
| 6,230,279 B1 | 5/2001 | Dewa et al. | |
| 7,200,741 B1 | 4/2007 | Mine | |
| 7,506,278 B1 * | 3/2009 | Rjimati et al. | 716/104 |
| 7,555,566 B2 | 6/2009 | Blumrich et al. | |
| 7,958,182 B2 | 6/2011 | Arimilli et al. | |
| 7,958,183 B2 | 6/2011 | Arimilli et al. | |
| 8,094,575 B1 * | 1/2012 | Vadlakonda et al. | 370/252 |
| 2002/0095562 A1 | 7/2002 | Nakanishi et al. | |
| 2003/0048785 A1 | 3/2003 | Calvignac et al. | |
| 2004/0015591 A1 | 1/2004 | Wang | |
| 2004/0236891 A1 | 11/2004 | Arimilli et al. | |
| 2005/0044301 A1 | 2/2005 | Vasilevsky et al. | |
| 2006/0080417 A1 | 4/2006 | Boutboul et al. | |
| 2006/0146715 A1 | 7/2006 | Supalov | |
| 2006/0152593 A1 | 7/2006 | Bone et al. | |
| 2006/0200278 A1 | 9/2006 | Feintuch | |
| 2007/0088933 A1 | 4/2007 | Kelley | |
| 2009/0006808 A1 | 1/2009 | Blumrich et al. | |
| 2009/0063815 A1 | 3/2009 | Arimilli et al. | |
| 2009/0063816 A1 * | 3/2009 | Arimilli et al. | 712/30 |
| 2009/0327312 A1 * | 12/2009 | Kakivaya et al. | 707/10 |
| 2011/0173258 A1 | 7/2011 | Arimilli et al. | |
| 2011/0238956 A1 | 9/2011 | Arimilli et al. | |

FOREIGN PATENT DOCUMENTS

JP     2001069569 A    3/2001

OTHER PUBLICATIONS

Final Office Action mailed Feb. 26, 2013 for U.S. Appl. No. 12/749,100, 23 pages.
Notice of Allowance rnailed Dec. 6, 2012 for U.S. Appl. No. 12/640,208; 11 pages.
Response to Office Action filed Dec. 21, 2012, U.S. Appl. No. 12/749,100, 14 pages.
Appeal Brief filed Jun. 24, 2013, U.S. Appl. No. 12/749,100, 24 pages.
Office Action dated Sep. 24, 2012 for U.S. Appl. No. 12/749,100; 26 pages.
Response to Office Action filed Aug. 8, 2012, U.S. Appl. No. 12/640,208, 14 pages.
Office Action mailed Sep. 25, 2013 for U.S. Appl. No. 12/749,100, 25 pages.
USPTO U.S. Appl. No. 11/845,223, 3 pages.
USPTO U.S. Appl. No. 11/845,224, Jul. 11, 2012, 4 pages.
USPTO U.S. Appl. No. 12/640,208, Jul. 11, 2012, 2 pages.
USPTO U.S. Appl. No. 12/749,100, 1 page.
Fouad, Mohamed R. et al., "Latency-Sensitive Power Control for Wireless Ad-hoc Networks", ACM, 2005, pp. 31-38.
Kumar, S et al., "Improved Point-to-Point and Collective Communication Performance with Output-Queued High-Radix Routers", AN-8815937, High Performance Computing-HiPC, 12th International Conference, Proceedings, Goa, India, 2005, 1 page.
Nasiri, Javad M. et al., "Enhancement Energy Efficient TDMA Wake Up MAC Protocol by Clustering for Wireless Sensor Networks", ACM, 2008, pp. 81-85.

* cited by examiner

*Primary Examiner* — Kyung H Shin
(74) *Attorney, Agent, or Firm* — Stephen R. Tkacs; Stephen J. Walder, Jr.; Diana R. Gerhardt

(57) ABSTRACT

A mechanism is provided in a collective acceleration unit for performing a collective operation to distribute or collect data among a plurality of participant nodes. The mechanism receives an input collective packet for a collective operation from a neighbor node within a collective tree. The input collective packet comprises a tree identifier and an input data field and wherein the collective tree comprises a plurality of sub trees. The mechanism maps the tree identifier to an index within the collective acceleration unit. The index identifies a portion of resources within the collective acceleration unit and is associated with a set of neighbor nodes in a given sub tree within the collective tree. For each neighbor node the collective acceleration unit stores destination information. The collective acceleration unit performs an operation on the input data field using the portion of resources to effect the collective operation.

10 Claims, 7 Drawing Sheets

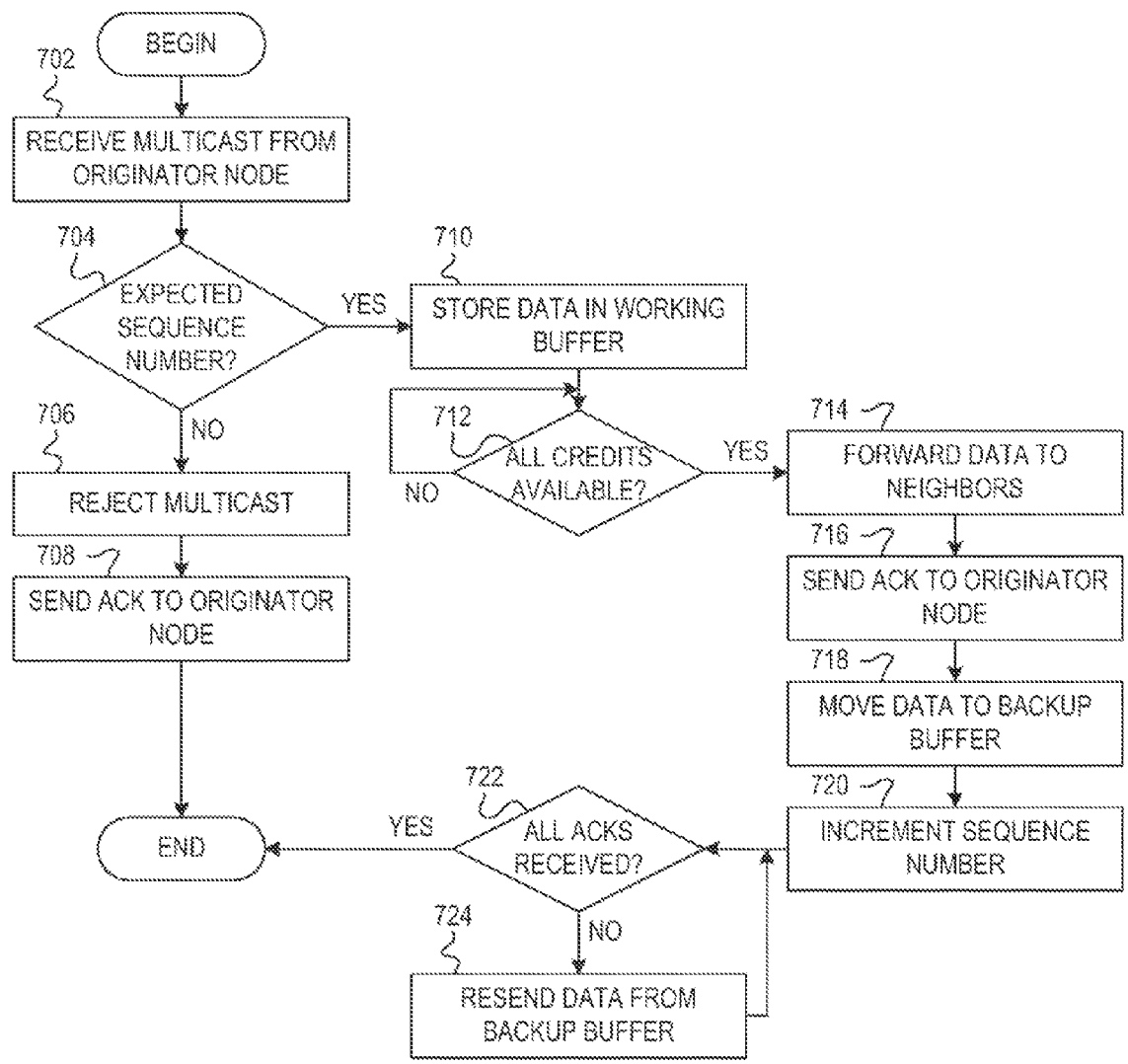

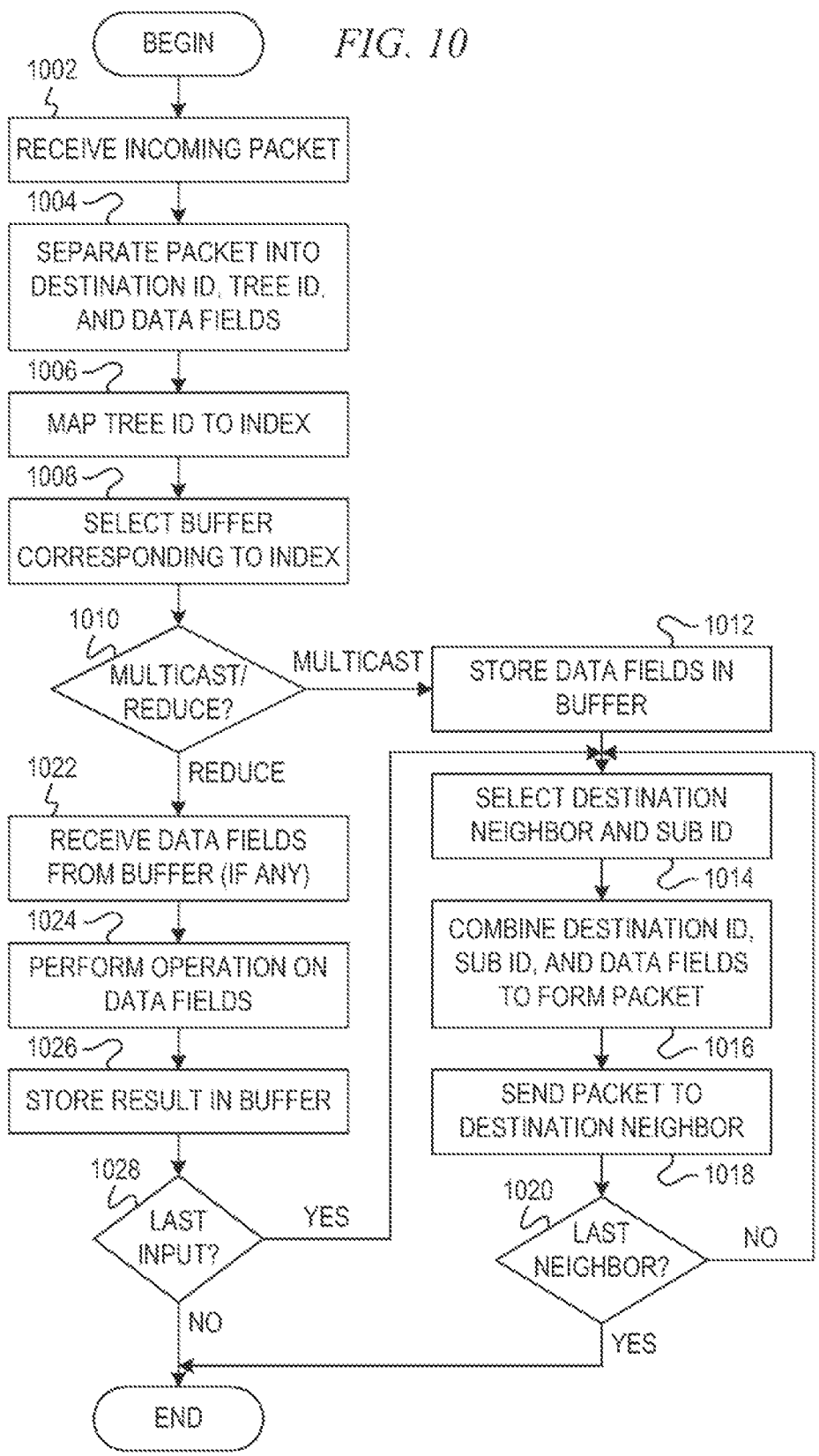

US 8,756,270 B2

COLLECTIVE ACCELERATION UNIT TREE STRUCTURE

This application is a continuation of application Ser. No. 12/749,100, filed Mar. 29, 1010, status-pending.

GOVERNMENT RIGHTS

This invention was made with Government support under DARPA, HR0011-07-9-0002. THE GOVERNMENT HAS CERTAIN RIGHTS IN THIS INVENTION.

BACKGROUND

The present application relates generally to an improved data processing system and method. More specifically, the present application is directed to performing collective operations using a collective acceleration unit tree structure.

Ongoing advances in distributed multi-processor computer systems have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband, and RapidIO®), TCP offload engines, and zero-copy data transfer techniques (e.g., remote direct memory access). Efforts have also been increasingly focused on improving the speed of host-to-host communications within multi-host systems. Such improvements have been achieved in part through the use of high-speed network and network switch fabric technologies.

SUMMARY

In one illustrative embodiment, a method is provided in a data processing system for performing a collective operation to distribute or collect data among a plurality of participant nodes. The method comprises receiving, in a collective acceleration unit, an input collective packet for a collective operation from a neighbor node within a collective tree. The input collective packet comprises a tree identifier and an input data field and wherein the collective tree comprises a plurality of sub trees. The method further comprises mapping, by the collective acceleration unit, the tree identifier to an index within the collective acceleration unit. The index identifies a portion of resources within the collective acceleration unit and is associated with a set of neighbor nodes in a given sub tree within the collective tree. For each neighbor node the collective acceleration unit stores destination information. The method further comprises performing, by the collective acceleration unit, an operation on the input data field using the portion of resources to effect the collective operation.

In another illustrative embodiment, a data processing system comprises a plurality of processor nodes and a network interface communicatively coupled to at least one of the plurality of processor nodes. The network interface comprises a collective acceleration unit. The collective acceleration unit comprises a storage device. The collective acceleration unit is configured to receive an input collective packet for a collective operation from a neighbor node within a collective tree. The input collective packet comprises a tree identifier and an input data field. The collective tree comprises a plurality of sub trees. The collective acceleration unit is configured to map the tree identifier to an index within the collective acceleration unit. The index identifies a portion of resources within the collective acceleration unit and is associated with a set of neighbor nodes in a given sub tree within the collective tree. For each neighbor node the collective acceleration unit stores destination information. The collective acceleration unit is configured to perform an operation on the input data field using the portion of resources to effect the collective operation.

In another illustrative embodiment, a collective acceleration unit comprises a separating component, a content addressable memory, a storage device, and an arithmetic logic unit. The separating component is configured to receive an input collective packet for a collective operation from a neighbor node within a collective tree and separate the input collective packet into a tree identifier and an input data field. The collective tree comprises a plurality of sub trees. The content addressable memory is configured to map the tree identifier to an index within the collective acceleration unit. The index identifies a portion of resources within the collective acceleration unit and is associated with a set of neighbor nodes in a given sub tree within the collective tree. For each neighbor node the collective acceleration unit stores destination information. The arithmetic logic unit is configured to perform an operation on the input data field to effect the collective operation.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of a collective acceleration unit processing a multicast operation in accordance with an illustrative embodiment;

FIG. 10 is a flowchart illustrating operation of a collective acceleration unit performing a collective operation using collective tree indexes in accordance with an illustrative embodiment.

DETAILED DESCRIPTION

Figure 1:
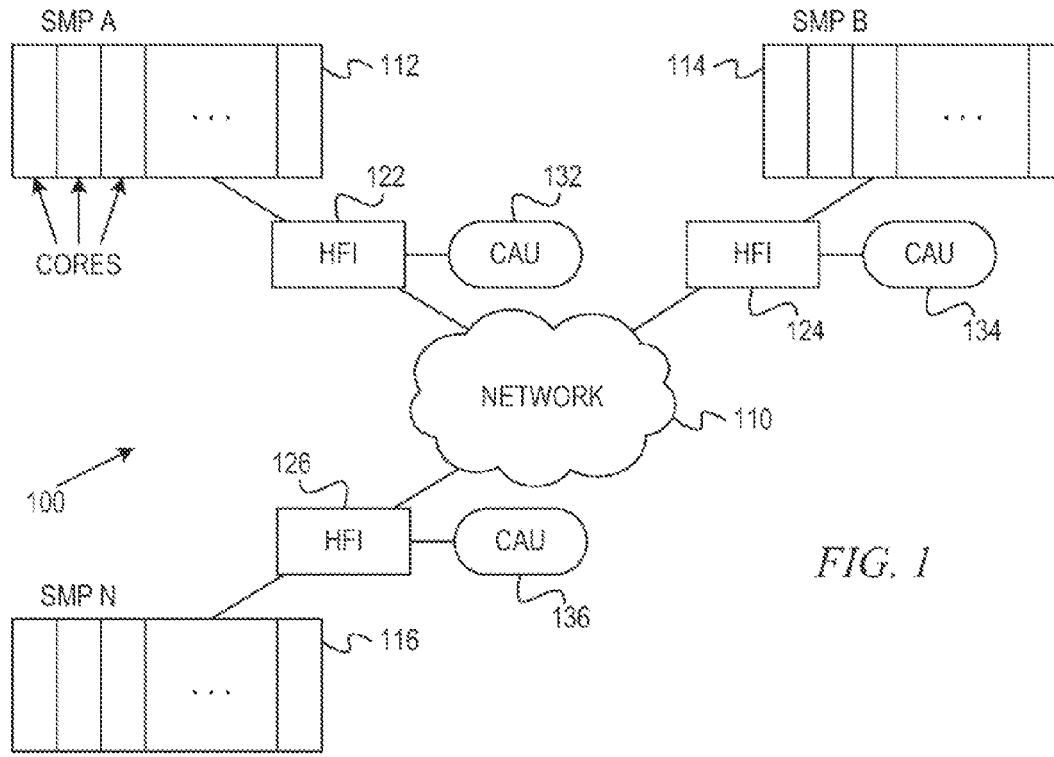
FIG. 1 depicts a pictorial representation of an exemplary distributed data processing system in which aspects of the illustrative embodiments may be implemented.
Figure 2:
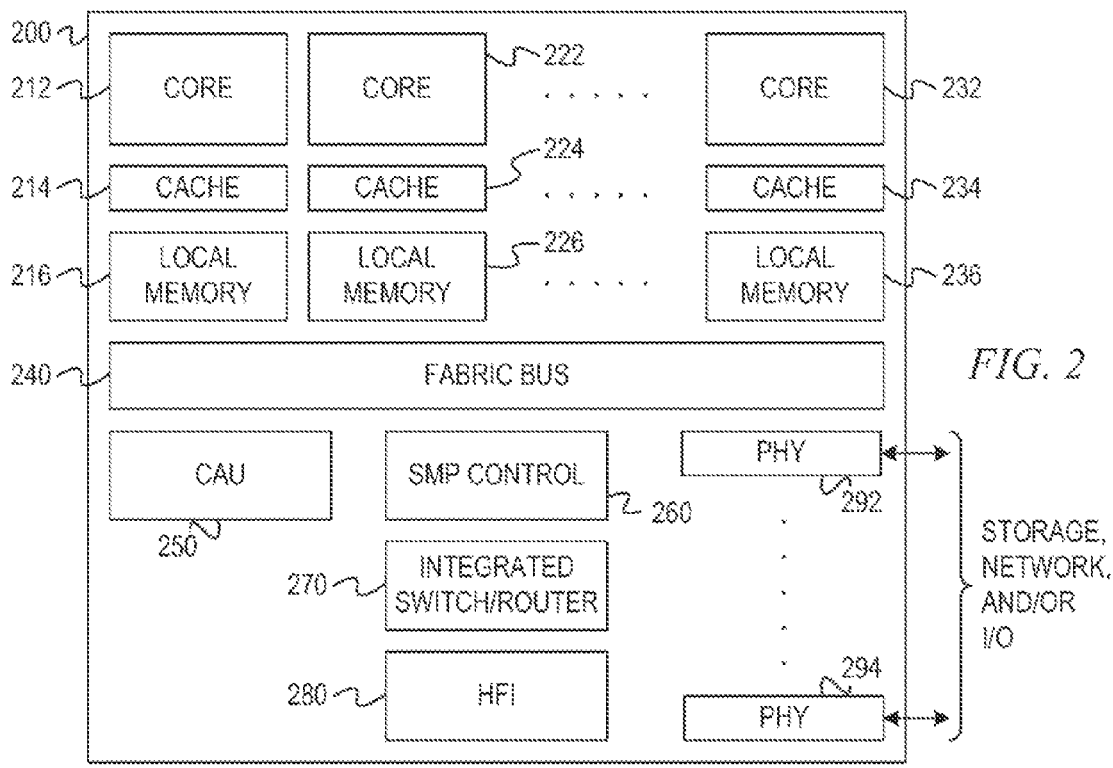
FIG. 2 depicts an exemplary logical view of a processor chip, which may be part of a symmetric multiprocessing device in a data processing system, in accordance with one illustrative embodiment.
Figure 3:
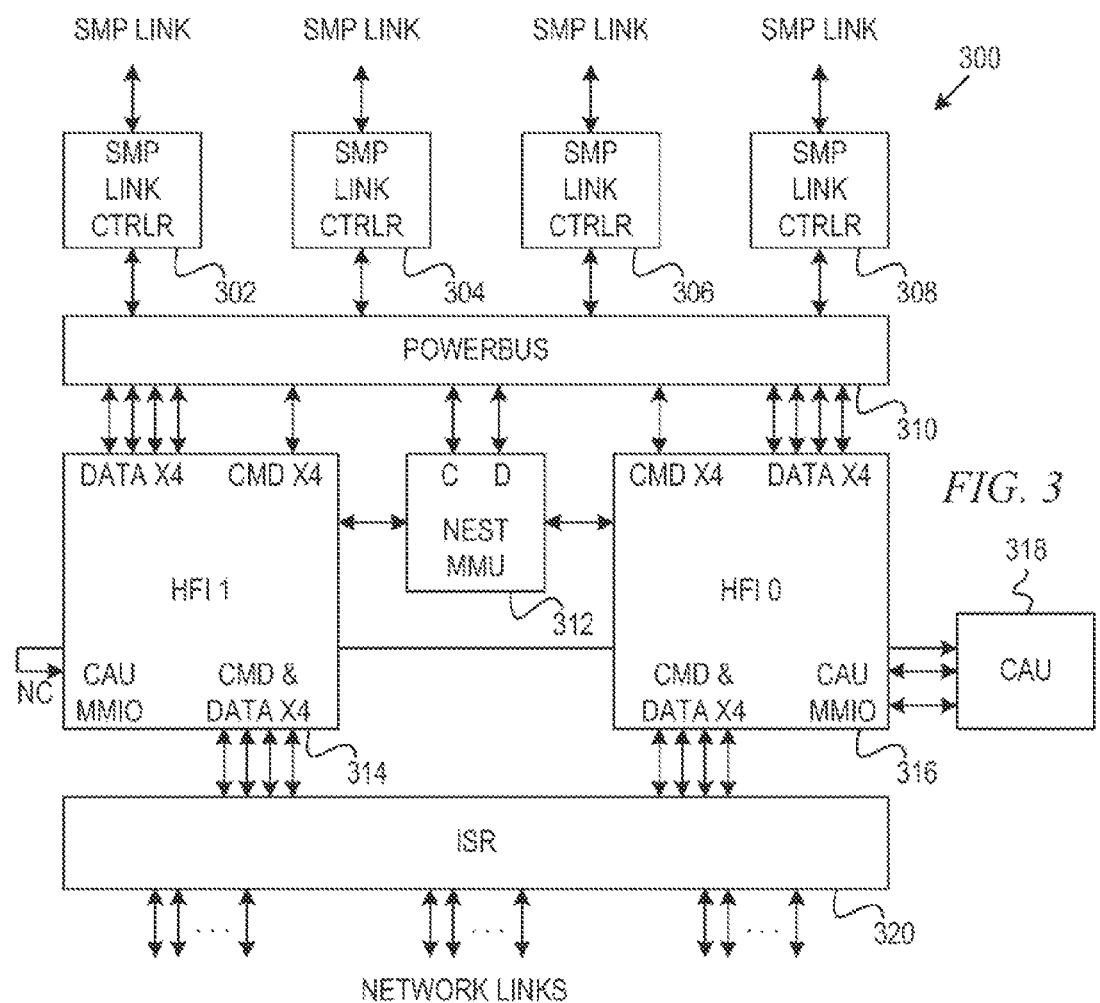
FIG. 3 is a block diagram depicting an intermediate device connecting a symmetric multiprocessing device to a network in accordance with an illustrative embodiment.

The illustrative embodiments provide an architecture and mechanisms for facilitating communication between processors to perform collective operations using a collective tree structure. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-3 are provided hereafter as examples of a distributed data processing system, or environment, and data processing devices, in which, or with which, the mechanisms of the illustrative embodiments may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 110, which is the medium used to provide communication links between various devices and computers connected together within distributed data processing system 100. The network 110 may include connections, such as wire, wireless communication links, or fiber optic cables.

In the depicted example, symmetric multiprocessing (SMP) devices 112, 114, and 116 are connected to network 110 via host fabric interfaces (HFIs) 122, 124, and 126, respectively. The SMP devices, SMP A 112, SMP B 114, and SMP N 116, may include a plurality of processing cores. Data processing system 100 may include any number of SMP devices depending on the implementation. In one example embodiment, each SMP device may include four processor chips having eight cores for a total of thirty-two cores per SMP device, although an SMP device may include more or fewer processor chips or cores depending on the implementation.

HFIs 122, 124, and 126 have associated collective acceleration units (CAUs) 132, 134, and 136, respectively. CAUs 132, 134, 136 control the implementation of collective operations (collectives), which may encompass a wide range of possible algorithms, topologies, methods, and the like. HFIs 122, 124, and 126 and network 110 comprise a high-performance communication subsystem for an interconnect network. Network 110 may comprise integrated switch/routers (ISRs) and links (not shown).

HFIs 122, 124, 126 and CAUs 132, 134, 136 may be integrated into the processor chips of SMP devices 112, 114, 116, which may significantly reduce communication latency and improve performance of parallel applications by drastically reducing adapter overhead. Alternatively, due to various chip integration considerations (such as space and area constraints), HFIs 122, 124, 126 and CAUs 132, 134, 136 may be located on a separate chip that is connected to the processor chip. HFIs 122, 124, 126 and CAUs 132, 134, 136 may also be shared by multiple processor chips, permitting a lower cost implementation.

Distributed data processing system 100 may include additional SMP devices, HFIs, CAUs, and other devices not shown. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In accordance with an illustrative embodiment, distributed data processing system 100 supports distributed parallel applications (programs that run on many processors that are network connected), which require communication among the processors. In the illustrative embodiment, the processors perform collective operations, including multicast operations and reduce operations. Multicast operations communicate from a source node to a plurality of destination nodes. For example, a root processor may send data to all of the other nodes in a logically connected tree, referred to as a "collective tree" herein, using a multicast operation. The processors at the other nodes perform some work on the data and return the results.

A reduce operation combines data from a plurality source nodes and forwards the combined data to a destination node. For instance, in the above example a plurality of processors may return the results of their work to the source node using a reduce operation.

To facilitate this communication, a system for collective acceleration unit tree flow control forms a logical tree (subnetwork) among those processors and transfers "collective" packets on this tree. The system supports many collective trees, and each collective acceleration unit (CAU) includes resources to support a subset of the trees. A CAU may replicate a packet or combine multiple packets on this tree. Interconnected CAUs and their neighbor nodes make up each tree. For a given set of collective operations, the root of the tree is considered to be the source of the initial multicast operation and the source of the final reduce operation. That is, the root sends data out to the other nodes of the tree using a multicast operation and collects the results from the other nodes of the tree by receiving a reduce operation from a neighboring CAU.

More particularly, software running on a SMP may distribute a job to processors. The software builds a collective tree to connect the processors (i.e. cores) together by CAUs, such as CAUs 132, 134, 136. For optimal performance, the software may build the tree such that a given CAU connects to the nodes to which it has a close association, even though a given CAU may communicate with any processor in distributed data processing system 100. However, a CAU has limited resources, and a CAU may have a close association with a large number of processors.

In accordance with the illustrative embodiments, the software may map the collective tree into a plurality of sub-trees, or "indexes." Each CAU 132, 134, 136 is configured to support a number of indexes based on the amount of buffer space in the CAU. For example, in one implementation, a CAU may support sixty-four indexes, where each index logically connects the CAU to up to nine neighbors. The neighbors may be any combination of processors and/or neighboring CAUs. A plurality of sub-trees combine to form an overall collective tree.

A CAU may be a member of more than one tree. For example, with sixty-four indexes, a CAU may be a member of sixty-four different trees. However, A CAU may have more than one index within the same tree, such that the CAU is a neighbor of itself.

Collective packets include a tree identifier (ID) field, which must be large enough for each collective tree to have a unique tree ID. Each CAU has resources associated with each of its indexes. That is, within the CAU, the index identifies a portion of the resources to be used for a given sub tree. The resources include an arithmetic logic unit (ALU), a buffer space for intermediate results, a list of neighbors, and packet processing state machines. Each CAU stores destination information needed to identify each neighbor and the associated sub tree for that CAU. The CAU receives arriving collective packets and generates collective packets it transmits to one or more neighbors.

The tree ID comprises an "inclusive portion" and a "sub tree portion." The sub tree portion of the tree ID, referred to as a "sub ID," is specific to a logical node within the tree, i.e. an index. The inclusive portion is unique to the entire collective tree. In one example embodiment, the tree ID may be thirty-two bits, where the sub ID is a predetermined number of least significant bits (LSB) of the tree ID, e.g., the nine LSB of the tree ID. Thus, a given CAU may actually represent multiple logical nodes in the same collective tree, each logical node having a different sub ID but the same MSB of the tree ID. This is particularly useful when a collective tree has many processors (root or leaves) and few CAUs (internal nodes), such that the small number of neighbors for a given CAU is insufficient to describe all of the processors attached to a CAU for a given collective tree. Note that if a tree ID does not have any node-specific bits, then it would not be possible to have multiple indexes within a CAU being part of the same collective tree.

FIG. 2 depicts an exemplary logical view of a processor chip, which may be part of a symmetric multiprocessing device in a data processing system, in accordance with one illustrative embodiment. Processor chip 200 may be logically separated into the following functional components: homogeneous processor cores 212, 222, 232 and local memories 216, 226, 236. In one example embodiment, processor chip 200 may include eight processor cores 212, 222, 232 and local memories 216, 226, 236, although any type and number of processor cores and local memories may be supported in processor chip 200.

Processor chip 200 may be a system-on-a-chip such that each of the elements depicted in FIG. 2 may be provided on a single microprocessor chip. Moreover, in an alternative embodiment processor chip 200 may be a heterogeneous processing environment in which each of processor cores 212, 222, 232 may execute different instructions from each of the other processor cores in the system. Moreover, the instruction set for processor cores 212, 222, 232 may be different from other processor cores, that is, one processor core may execute Reduced Instruction Set Computer (RISC) based instructions while other processor cores execute vectorized instructions. Each of processor cores 212, 222, 232 in processor chip 200 may also include an associated one of caches 214, 224, 234 for core storage.

In the depicted example, processor chip 200 implements fabric bus 240 and other I/O structures to facilitate on-chip and external data flow. Fabric bus 240 serves as the primary on-chip bus for processor cores 212, 222, 232. In addition, fabric bus 240 interfaces to other on-chip interface controllers that are dedicated to off-chip accesses. The on-chip interface controllers may be physical interface macros (PHYs) 292 and 294 that support multiple high-bandwidth interfaces, such as PCIx, Ethernet, memory, storage, and the like. Although PHYs 292 and 294 are shown by example, any type and number of PHYs may be supported in processor chip 200. PHYs 292 or 294 provide a plurality of selectable interfaces, such that PHYs 292 or 294 disable the non-selected interfaces once a specific interface is selected. In one example embodiment, one or more of PHYs 292 and 294 may support communication with HFIs 122, 124, 126 in FIG. 1.

Processor chip 200 may also include host fabric interface (HFI) 280 and integrated switch/router (ISR) 270. HFI 280 and ISR 270 comprise a high-performance communication subsystem for an interconnect network, such as network 110 of FIG. 1. Integrating HFI 280 and ISR 270 into processor chip 200 may significantly reduce communication latency and improve performance of parallel applications by drastically reducing adapter overhead. Alternatively, due to various chip integration considerations (such as space and area constraints), HFI 280 and ISR 270 may be located on a separate chip that is connected to the processor chip. HFI 280 and ISR 270 may also be shared by multiple processor chips, permitting a lower cost implementation.

Processor chip 200 may also include symmetric multiprocessing (SMP) control 260 and collective acceleration unit (CAU) 250. Alternatively, these SMP control 260 and CAU 250 may also be located on a separate chip that is connected to processor chip 200. SMP control 260 may provide fast performance by making multiple cores available to complete individual processes simultaneously, also known as multiprocessing. Unlike asymmetrical processing, SMP control 260 may assign any idle processor cores 212, 222, 232 to any task and add additional ones of processor cores 212, 222, 232 to improve performance and handle increased loads.

CAU 250 controls the implementation of collective operations (collectives), which may encompass a wide range of possible algorithms, topologies, methods, and the like. In an alternative embodiment, CAU 250 may be located within HFI 280, within a communication adapter, or within a service processor running a virtualization layer.

HFI 280 acts as the gateway to the interconnect network. In particular, processor core 212, 222, 232 may access HFI 280 over fabric bus 240 and request HFI 280 to send messages over the interconnect network. HFI 280 composes the message into packets that may be sent over the interconnect network, by adding routing header and other information to the packets. ISR 270 acts as a router in the interconnect network. ISR 270 performs the following functions: ISR 270 accepts network packets from HFI 280 that are bound to other destinations, and ISR 270 provides HFI 280 with network packets that are bound to be processed by one of processor cores 212, 222, 232. CAU 250 improves the system performance and the performance of collective operations by carrying out collective operations within the interconnect network, as collective communication packets are sent through the interconnect network. More details on each of these units will be provided further along in this application.

By directly connecting HFI 280 to fabric bus 240, by performing routing operations in an integrated manner through ISR 270, and by accelerating collective operations through CAU 250, processor chip 200 eliminates much of the interconnect protocol overheads and provides applications with improved efficiency, bandwidth, and latency.

It should be appreciated that processor chip 200 shown in FIG. 2 is only exemplary of a processor chip which may be used with the architecture and mechanisms of the illustrative embodiments. Those of ordinary skill in the art are well aware that there are a plethora of different processor chip designs currently available, all of which cannot be detailed herein. Suffice it to say that the mechanisms of the illustrative embodiments are not limited to any one type of processor chip design or arrangement and the illustrative embodiments may be used with any processor chip currently available or which may be developed in the future. FIG. 2 is not intended to be limiting of the scope of the illustrative embodiments but is only provided as exemplary of one type of processor chip that may be used with the mechanisms of the illustrative embodiments.

FIG. 3 is a block diagram depicting an intermediate device connecting a symmetric multiprocessing device to a network in accordance with an illustrative embodiment. Intermediate device 300, which may be the combination of HFI 122 and CAU 132 in FIG. 1, for example, includes symmetric multiprocessor (SMP) link controllers 302, 304, 306, 308. These SMP link controllers connect intermediate device 300 to SMP links to SMP devices, such as SMP devices 112, 114, 116 in FIG. 1. SMP link controllers 302-308 connect to powerbus 310, which provides high speed communication for SMP links 302-308, host fabric interfaces (HFIs) 314, 316, and nest memory management unit 312.

Collective acceleration unit (CAU) 318 connects to HFIs 314, 316. CAU 318 controls the implementation of collective operations (collectives), which may encompass a wide range of possible algorithms, topologies, methods, and the like. Nest memory management unit (MMU) 312 translates effective addresses and real addresses. A CAU does not directly address shared memory. A CAU receives packets, stores data and intermediate results in its buffers space, and generates packets to be sent to other nodes. HFIs 314, 316 move packets from memory to CAU 318. This move operation requires address translation by MMU 312.

HFIs 314, 316 connect to integrated switch/router (ISR) 320. HFIs 314, 316 and ISR 320 comprise a high-performance communication subsystem for SMPs to communicate with a network through intermediate device 300.

As stated above, each CAU has limited buffer space, and the connection between two CAUs is not completely reliable. Therefore, in accordance with an illustrative embodiment, to address the challenge of collective packets traversing on the tree without colliding with each other for buffer space and guaranteeing the end-to-end packet delivery, each CAU in the system effectively flow controls the packets, detects packet loss, and retransmits lost packets.

Figure 4A:
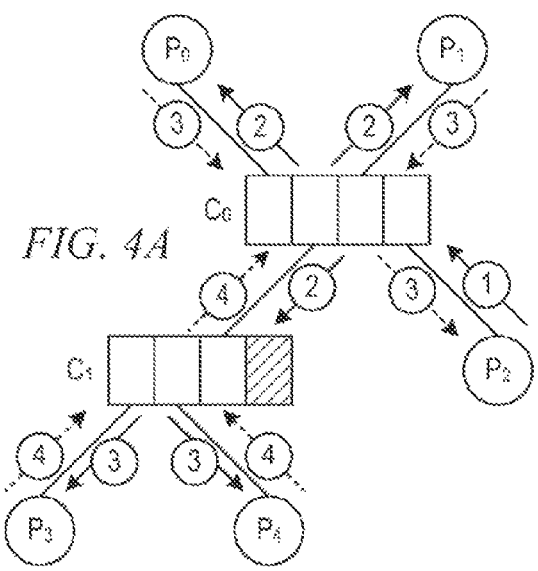
FIG. 4A illustrates collective tree flow control for a multicast operation in accordance with an illustrative embodiment.

FIG. 4A illustrates collective tree flow control for a multicast operation in accordance with an illustrative embodiment. Processor nodes $P_0$, $P_1$, and $P_2$ connect to collective acceleration unit (CAU) $C_0$. Processor nodes $P_3$ and $P_4$ connect to CAU $C_1$. $C_0$ connects to $C_1$. The topology shown in FIG. 4A forms a collective tree, which is represented by an index in each of CAUs $C_0$ and $C_1$. Processor nodes and CAUs may be part of multiple collective trees. In an example embodiment, each CAU $C_0$, $C_1$ may support 64 indexes.

As shown in FIG. 4A, processor node $P_2$ sends a multicast collective packet to CAU $C_0$ (step 1). The multicast packet includes the address of CAU $C_0$. Route information identifying neighbor nodes, which may include processor nodes and CAU nodes, is stored in the tree index within CAU $C_0$. The multicast packet also includes a sequence number. CAU $C_0$ accepts the multicast packet only if the sequence number of the multicast packet has an expected value. If the multicast packet does not have the expected sequence number, CAU $C_0$ rejects the multicast packet. In the depicted example, CAU $C_0$ receives the multicast packet from processor node $P_2$ and forwards the packet to processor nodes $P_0$, $P_1$ and CAU $C_1$ (step 2).

Each CAU $C_0$, $C_1$ has two buffers per supported tree, a working buffer to process the cumin operation and a backup buffer to store the output of the previous operation. In one example embodiment, the roles of the working buffer and backup buffer may simply flip without moving data between the two buffers.

To prevent buffer overrun, each CAU keeps one credit for each neighbor in the tree. When one CAU, such as CAU $C_0$, sends a multicast packet to a neighboring CAU, such as CAU $C_1$, the associated credit is consumed and the next send to the same neighbor must wait for the credit to be returned. In an example embodiment, a CAU may keep a credit by setting a credit bit. The CAU may then clear the credit bit when the credit is consumed and reset the bit when the credit is returned (when the recipient returns an acknowledgement (ACK)).

Once CAU $C_0$ has forwarded the multicast packet, CAU $C_0$ sends an ACK to the originating processor node $P_2$ and moves the data from the working buffer to the backup buffer and frees up the working buffer to process the next operation (step 3). Processor node $P_2$ keeps a copy of the data until CAU $C_0$ sends an ACK; if processor node $P_2$ does not receive an ACK, processor node $P_2$ resends the data. The CAU tags the ACK with the same sequence number as the input from processor node $P_2$.

Also in step 3, processor nodes $P_0$, $P_1$ send an ACK to CAU $C_0$, and CAU $C_1$ forwards the multicast packet to recipient processor nodes $P_3$, $P_4$. Again, processor nodes $P_3$, $P_4$ tag the ACKs with the same sequence number as the multicast packet received from CAU $C_0$. CAU $C_0$ only accepts ACKs tagged with the expected sequence number. To reduce complexity, when the output is to multiple neighbors, CAU $C_0$ sends to multiple neighbors together and waits for all needed credits.

Once CAU $C_1$ has forwarded the multicast packet, CAU $C_1$ sends an ACK to CAU $C_0$ (step 4). Also in step 4, processor nodes $P_3$, $P_4$ send an ACK back to CAU $C_1$. After step 4, processor nodes $P_0$, $P_1$ and CAU $C_1$ have sent ACKs back to CAU $C_0$, and processor nodes $P_3$, $P_4$ have sent an ACK back to CAU $C_1$; therefore, CAU $C_0$ and CAU $C_1$ determine that all credits have been returned. In response to all credits being returned, CAU $C_0$ and CAU $C_1$ may then send the next collective.

Because each CAU sends to multiple neighbors together and waits for all needed credits, each CAU may receive a next collective into its working buffer before receiving all the credits from the previous collective. For example, CAU $C_0$ may send data to its neighbors, send an ACK to processor node $P_2$, move the data to the backup buffer, and then receive another collective from processor node $P_0$, for example, into the working buffer before all of the credits from the previous collective have been returned. CAU $C_0$ must then wail until all of the credits, have been returned to send the next collective. If a CAU does not receive an ACK from a node within a predetermined time period, the CAU resends the data from the backup buffer to that node, because either the node never received the data or the ACK was dropped.

Figure 4B:
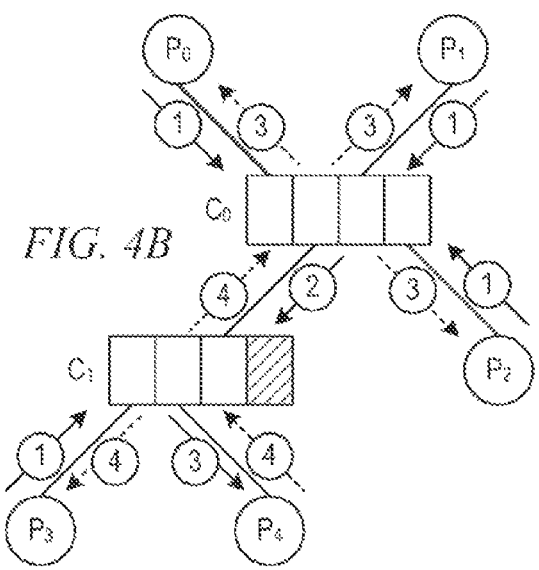
FIG. 4B illustrates collective tree flow control for a reduce operation in accordance with an illustrative embodiment.

FIG. 4B illustrates collective tree flow control for a reduce operation in accordance with an illustrative embodiment. As shown in FIG. 23B, processor nodes $P_0$, $P_1$, and $P_2$ send reduce operations to CAU $C_0$, and processor node $P_3$ sends a reduce operation to CAU $C_1$ (step 1). The reduce operation is intended for processor nodes $P_0$, $P_1$, $P_2$, and $P_3$ to send information to processor node $P_4$ through the tree. For each input, CAU $C_0$ receives and combines the data in the working buffer. Once CAU $C_0$ receives and combines all of the inputs from processor nodes $P_0$, $P_1$, and $P_2$, CAU $C_0$ forwards the combined data to CAU $C_1$ (step 2). Having forwarded the data, CAU $C_0$ then sends ACKs to processor nodes $P_0$, $P_1$, and $P_2$ and moves the combined data into the backup buffer (step 3).

Having received the combined data from CAU $C_0$, CAU $C_1$ combines the input from processor node $P_3$ with the input from CAU $C_0$ in its working buffer and forwards the combined data to processor node $P_4$ (step 3). Having forwarded the data, CAU $C_1$ then sends ACKs to processor node $P_3$ and CAU $C_0$ and moves the combined data into the backup buffer (step 4). Also in step 4, processor node $P_4$ sends an ACK to CAU $C_1$. If CAU $C_1$ does not receive an ACK from processor node $P_4$ within a predetermined time period, CAU $C_1$ resends the data from the backup buffer to processor node $P_4$.

Each processor node $P_0$, $P_1$, $P_2$, and $P^3$ sending a reduce collective operation packet keeps a copy of the data until an ACK is received. If a given processor node does not receive an ACK within a predetermined time period, the processor node resends the data. Each CAU keeps track of which inputs are received. If a CAU receives a duplicate input, the CAU rejects the input.

In the depicted example, when CAU $C_0$ sends data to CAU $C_1$ in step 2, CAU $C_1$ consumes an associated credit. CAU $C_0$ cannot send the next collective operation until the credit is returned. Similarly, when CAU $C_1$ sends the combined data to processor node $P_4$, CAU $C_1$ cannot send the next collective operation until the credit is returned.

Figure 5:
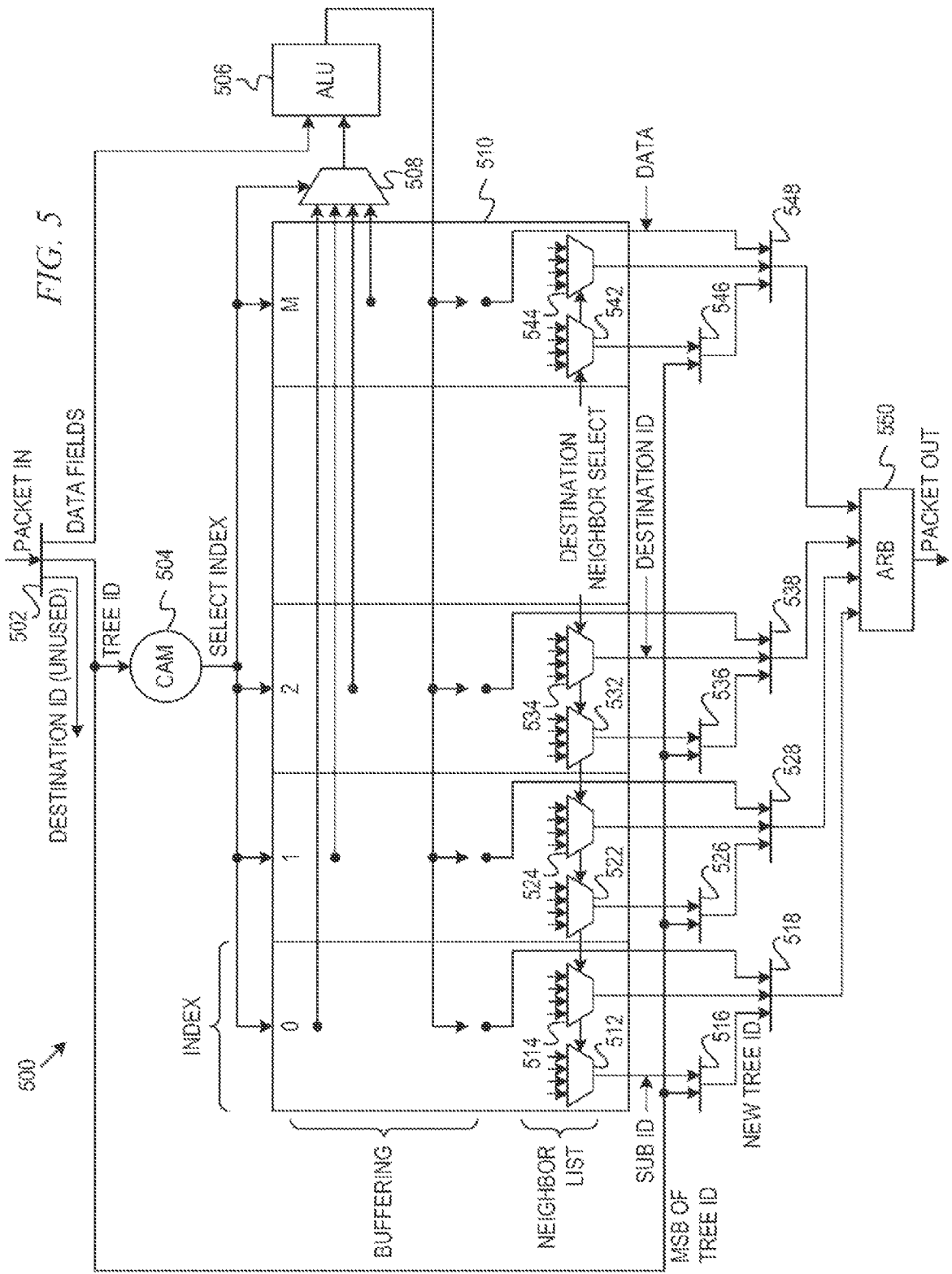
FIG. 5 depicts a collective acceleration unit for performing a collective operation using a collective tree structure in accordance with an illustrative embodiment.

FIG. 5 depicts a collective acceleration unit for performing a collective operation using a collective tree structure in accordance with an illustrative embodiment. Collective acceleration unit (CAU) 500 receives a collective packet (packet in), and separating component 502 separates the collective packet into a destination identifier (ID), a tree ID, and data fields. The destination ID is used to route the collective packet to CAU 500; therefore, the destination ID from the input packet is not used by CAU 500.

CAU 500 includes content addressable memory (CAM) 504, which maps the tree ID to an index, which identifies a portion of resources in CAU 500, such as a portion of buffer 510. Initialization of each index includes storing an entry in CAM 504 that associates the tree ID to the index and associating the index with destination information for destination neighbors in the sub tree corresponding to the index, including neighbors that are other CAU indexes in the same or different CAUs and/or neighbors that are processors. In the depicted example, CAU 500 supports M+1 indexes, where M is some predetermined number based on the topology of the distributed data processing system and the amount of storage in buffer 510. In one example embodiment, CAU 500 may support 64 indexes, although the number of indexes may vary depending upon the implementation.

Multiplexer 508 selects previous results, if any, from buffer 510 according to the index selected by CAM 504. Arithmetic logic unit (ALU) 506 receives data fields from the input packet and data fields from the selected index, if any. For a multicast operation. ALU 506 simply stores the data fields from the input packet into the selected index. CAU 500 then cycles through destination neighbors by incrementing a destination neighbor select value, which is provided to multiplexers 512, 514, 522, 524, 532, 534, 542, and 544. Multiplexers 512, 522, 532, and 542 receive as inputs sub IDs for the neighbors in the neighbor list of the index. Multiplexers 514, 524, 534, and 544 receive as inputs destination IDs for the neighbors in the neighbor list. The sub ID and destination ID for a given neighbor make up the destination information for the neighbor node.

A selected one of combining components 516, 526, 536, and 546 combines a sub ID for a selected destination neighbor, from a selected one of multiplexers 512, 522, 532, and 542, with the most significant bits (MSB) of the tree ID to form a new tree ID. A selected one of combining components 518, 528, 538, and 548 combines the new tree ID, from the selected one of combining components 516, 526, 536, and 546, a destination ID for a selected destination neighbor, from a selected one of multiplexers 514, 524, 534, and 544, and data output from the selected index to form an output collective packet. Arbiter 550 selects an output packet to transmit to a destination neighbor. CAU 500 may then generate and transmit a multicast packet to each of the neighbors in the neighbor list by incrementing the destination neighbor select value. In one example embodiment, each input may have nine neighbors in the neighbor list, although the number of neighbors per index may vary depending upon the implementation. CAU 500 will receive the multicast packet from one of the neighbors and cycle through the remaining neighbors to perform the multicast operation. Operation of a collective acceleration unit processing a multicast operation and generating multicast packets is described in further detail below with reference to FIG. 7.

For a first collective packet for a given reduce operation sequence number, ALU 506 stores the data fields from the input packet into the selected index. For subsequent packets for a given reduce operation, ALU 506 receives data fields from the input packet and data fields from the selected index, performs an operation, and stores the result in the selected index. In an example embodiment, the operations may include addition, AND, OR, XOR, or no-op. When CAU 500 receives and processes the last input packet for the given reduce operation, CAU 500 sets the destination neighbor select value to the appropriate value for the remaining neighbor and generates and transmits a reduce packet to the destination neighbor node. Operation of a collective acceleration unit processing a reduce operation and generating reduce packets is described in further detail below with reference to FIG. 8.

Figure 6:
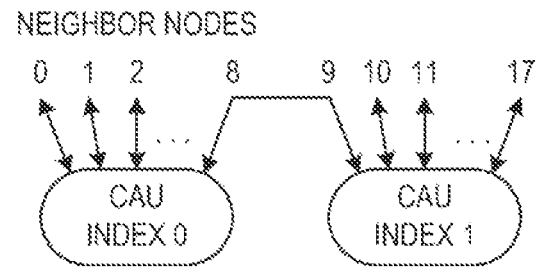
FIG. 6 illustrates a collective operation with multiple indexes in a collective acceleration unit for a collective tree in accordance with an illustrative embodiment.

FIG. 6 illustrates a collective operation with multiple indexes in a collective acceleration unit for a collective tree in accordance with an illustrative embodiment. In the depicted example, collective acceleration unit (CAU) index 0 has neighbor nodes 0-8 where node 8 is CAU index 1. Similarly, CAU index 1 has neighbor nodes 9-17, where node 9 is CAU index 0. If both CAU index 0 and CAU index 1 are on the same CAU, then they have the same destination ID and the same MSB of the tree ID. Only the sub ID would be different.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 7 is a flowchart illustrating operation of a collective acceleration unit processing a multicast operation in accordance with an illustrative embodiment. Operation begins, and the collective acceleration unit (CAU) receives a multicast packet from an originator node (block 702). The CAU then determines whether the multicast packet has an expected sequence number (block 704). If the CAU determines that the multicast packet does not have the expected sequence number, the CAU rejects the multicast packet (block 706). The CAU then sends an ACK with the same unexpected sequence number to the originator node (block 708) to cover the case when the previous ACK is lost, and operation ends.

If the CAU determines that the multicast packet has the expected sequence number in block 704, the CAU stores the data in its working buffer (block 710). The CAU then determines whether all credits are available (block 712). If not all of the credits have been returned from the previous collective operation, operation returns to block 712 until all credits are available.

If the CAU determines that all credits have been returned from the previous collective operation in block 712, the CAU forwards the data to neighbor nodes (block 714). The neighbor nodes may comprise zero or more processor nodes and zero or more CAU nodes. Then, the CAU sends an acknowledgement (ACK) packet to the originator node (block 716) and moves the data for the current collective operation to its backup buffer (block 718). In one example embodiment, the CAU may move the data for the current collective operation simply by flipping the roles of the working buffer and the backup buffer, so the working buffer becomes the backup buffer and vice versa. The CAU then increments the sequence number for the next collective operation (block 720).

Monitoring software within the data processing system monitors CAU traffic and determines whether all ACKs have been received from the neighbor nodes (block 722), i.e. whether all the credits have been returned. The CAU may not receive an ACK lithe original packet is lost, if the ACK is lost, or if neighboring node does not return an ACK due to processing delay at the node. If the CAU has not received ACKs from all of the neighbor nodes within a predetermined time period in block 722, the CAU resends the data from the backup buffer to the nodes from which a credit has not been returned (block 724), and operation returns to block 722 to determine whether all ACKs have been received from the neighbor nodes. If all of the credits have been returned in block 722, then operation ends.

Figure 8:
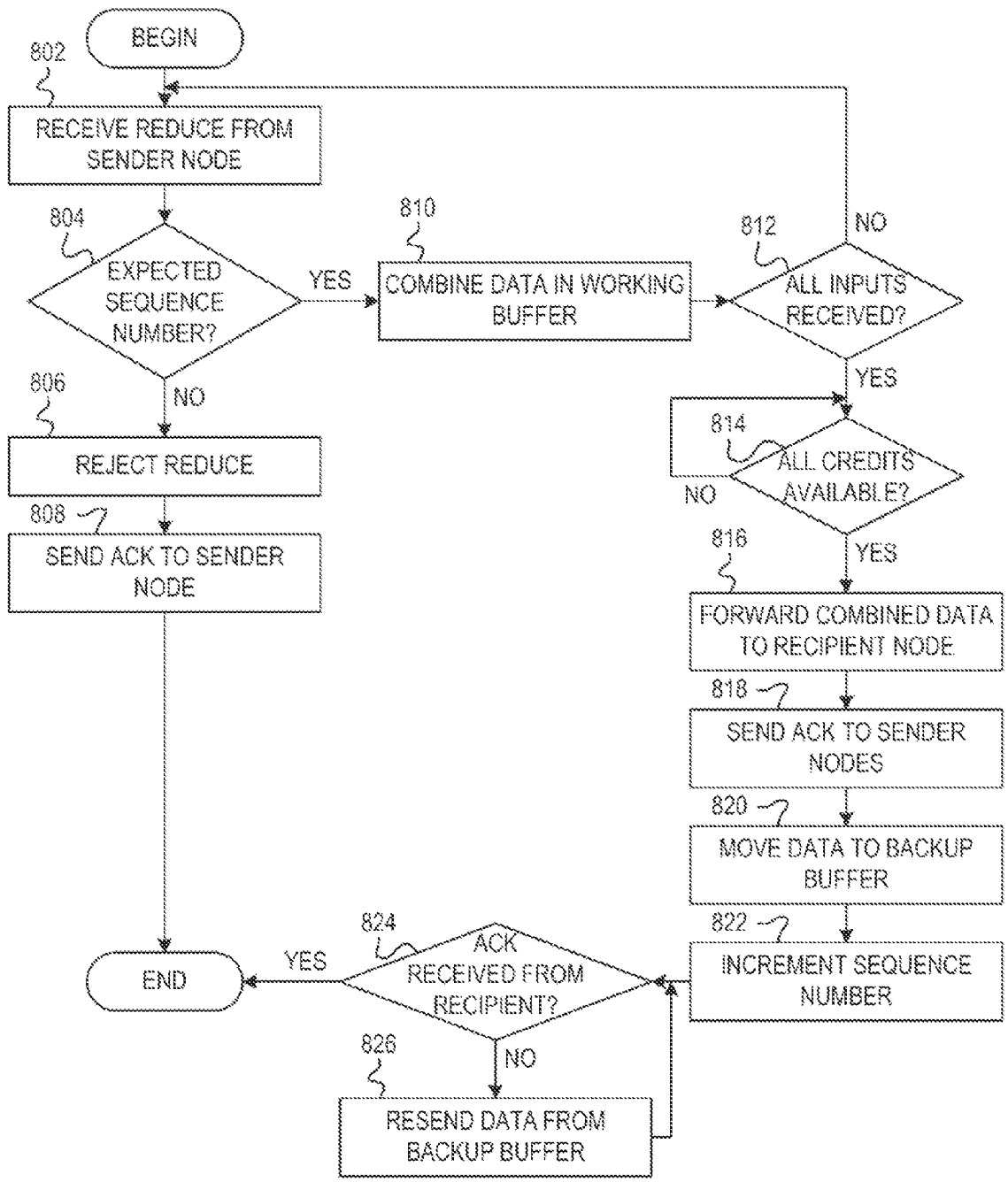
FIG. 8 is a flowchart illustrating operation of a collective acceleration unit processing a reduce operation in accordance with an illustrative embodiment.

FIG. 8 is a flowchart illustrating operation of a collective acceleration unit processing a reduce operation in accordance with an illustrative embodiment. Operation begins, and the collective acceleration unit (CAU) receives a reduce packet from a sender node (block 802). A sender node may be a processor node or a neighboring CAU node. The CAU determines whether the reduce packet has an expected sequence number (block 804). If the CAU determines that the reduce packet does not have an expected sequence number, then the CAU rejects the reduce packet (block 806). The CAU then sends an ACK with the same unexpected sequence number to the sender node (block 808) to cover the case when the previous ACK is lost, and operation ends.

If the CAU determines that the reduce packet has an expected sequence number in block 804, then the CAU combines that data in its working buffer (block 810). Then, the CAU determines whether all inputs for the reduce operation have been received (block 812). The CAU keeps track of which neighbor nodes have sent an input with the current sequence number. The CAU may make the determination in block 812 based on information in the reduce packet itself, such as the address of the target recipient node. If the target recipient node is a neighbor of the CAU, then the CAU waits until all of the remaining nodes, including other CAU nodes, if any, have sent an input. If the target recipient node is not a neighbor of the CALL then the CAU determines a neighboring CAU node to be the recipient node for the reduce operation. Alternatively, the CAU may make the determination in block 812 based on a number of neighboring nodes. For example, if the CAU has N neighboring nodes, then the CAU may simply determine whether N−1 inputs have been received. When the CAU determines that N−1 inputs have been received, then the CAU may send the combined data to the neighboring node that did not send an input.

If the CAU determines that not all inputs have been received in block 812, operation returns to block 802 to receive another input. If the CAU determines that all inputs have been received in block 812, then the CAU determines whether all credits are available (block 814). If not all of the credits have been returned from the previous collective operation, operation returns to block 814 until all credits are available. If the CAU determines that all credits have been returned from the previous collective operation in block 814, the CAU forwards the data to the recipient node (block 816). The recipient node may be a neighboring processor node or a neighboring CAU node. Next, the CAU sends an ACK to each sender node (block 818) and moves the data to its backup buffer (block 820). In one example embodiment, the CAU may move the data for the current collective operation simply by flipping the roles of the working buffer and the backup buffer, so the working buffer becomes the backup buffer and vice versa. The CAU then increments the sequence number for the next collective operation (block 822).

Monitoring software within the data processing system monitors CAU traffic and determines whether an ACK has been received from the recipient node (block 824), i.e. whether the credit has been returned. If the CAU has not received an ACK from the recipient node within a predetermined time period in block 824, the CAU resends the data from the backup buffer to the recipient node (block 826), and operation returns to block 824 to determine whether an ACK has been received from the recipient node. If the credit has been returned in block 824, then operation ends.

Figure 9:
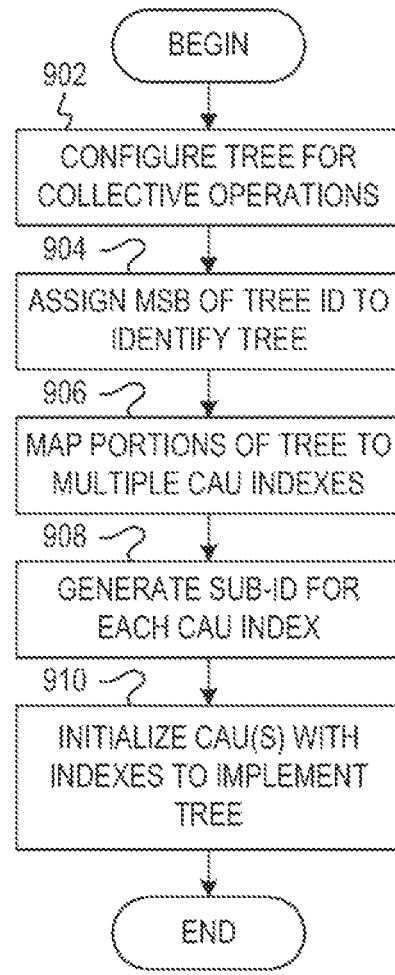
FIG. 9 is a flowchart illustrating initialization of a collective tree in accordance with an illustrative embodiment.

FIG. 9 is a flowchart illustrating initialization of a collective tree in accordance with an illustrative embodiment. Operation begins, and an application configures a tree for collective operations (block 902). The application assigns the most significant bits of a tree ID to identify the collective tree (block 904). Then, the application maps portions of the collective tree to multiple collective acceleration unit (CAU) indexes (block 906) and generates a sub ID for each CAU index (block 908). Then, the application initializes the CAU(s) with the indexes to implement the collective tree (block 910). Thereafter, operation ends.

FIG. 10 is a flowchart illustrating operation of a collective acceleration unit performing a collective operation using collective tree indexes in accordance with an illustrative embodiment. Operation begins, and the collective acceleration unit (CAU) receives an incoming packet (block 1002). The CAU separates the packet into a destination ID, a tree ID, and data fields (block 1004). The CAU maps the tree ID to an index (block 1006) and selects a buffer corresponding to the index (block 1008). The CAU may map the tree ID to an index using a content addressable memory, where each index supported by the CAU has an entry in the CAM indexed by sub ID. If a packet arrives that does not have an entry that matches the tree ID of the arriving packet, then the CAU generates an error.

The CAU determines whether the incoming packet is a multicast packet or a reduce packet (block 1010). If the packet is a multicast packet, then the CAU stores the data fields in the buffer area associated with the index (block 1012). The CAU then selects a destination neighbor having a destination ID and sub ED (block 1014). The CAU stores a destination neighbor list for each index and information for routing packets to each destination neighbor in the neighbor list, including a destination ID and sub ID for each neighbor. The CAU combines the most significant bits (MSB) of the tree ID and the sub ID to form a new tree ID and combines the new tree ID, destination ID, and data fields to form an output packet (block 1016). The CAU then sends the output packet to the selected destination neighbor (block 1018). Thereafter, the CAU determines whether the selected neighbor is the last neighbor to which to send a multicast packet (block 1020). If the neighbor is the last neighbor, then operation ends. If the neighbor is not the last neighbor in the neighbor list in block 1020, then operation returns to block 1014 to select a next destination neighbor.

Returning to block 1010, if the packet is a reduce packet, the CAU receives data fields from the selected index (buffer), if any (block 1022). The CAU performs an operation on the data fields (block 1024) and stores the result in the selected index (buffer) (block 1026). The CAU then determines whether the packet is the last packet for the given reduce operation (block 1026). If the packet is the last packet for the reduce operation, meaning the CAU has received reduce packets from all of the source nodes, then operation proceeds to block 1014 to select a destination neighbor, combine the MSB of the tree ID and the sub ID to form a new tree ID, combine the new tree ID, destination ID, and data fields to form an output packet, and send the output packet to the selected destination neighbor. For a reduce operation, there will be only one neighbor; therefore, the CAU will determine that the neighbor is the last neighbor in block 1020.

If the packet is not the last packet in block 1028, then operation ends. The CAU will repeat operation of FIG. 10 until the CAU has received reduce collective packets from all of the source nodes.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a highly-configurable, scalable system that integrates computing, storage, networking, and software. The illustrative embodiments provide for collective acceleration unit tree flow control forms a logical tree (sub-network) among those processors and transfers "collective" packets on this tree. The system supports many collective trees, and each collective acceleration unit (CAU) includes resources to support a subset of the trees. Each CAU has limited buffer space, and the connection between two CAUs is not completely reliable. Therefore, in accordance with an illustrative embodiment, to address the challenge of collective packets traversing on the tree without colliding with each other for buffer space and guaranteeing the end-to-end packet delivery, each CAU in the system effectively flow controls the packets, detects packet loss, and retransmits lost packets.

Software may map the collective tree into a plurality of sub-trees, or "indexes." Each CAU is configured to support a number of indexes based on the amount of buffer space in the CAU. For example, in one implementation, a CAU may support sixty-four indexes, where each index logically connects the CAU to up to nine neighbors. The neighbors may be any combination of processors and/or neighboring CAUs. A plurality sub-trees combine to form an overall collective tree.

A CAU may be involved in more than one tree, and a CAU may have more than one index within the same tree, such that the CAU is a neighbor of itself. Collective packets include a tree identifier (ID) field, which must be large enough for each collective tree to have a unique tree ID. Each CAU has resources associated with each of its indexes. The resources include an arithmetic logic unit (ALU), buffer space for intermediate results, and a list of neighbors. Each CAU stores information needed to route packets to each neighbor. The CAU receives arriving collective packets and generates collective packets it transmits to one or more neighbors.

A portion of the tree ID, referred to as a "sub ID" is specific to a logical node within the tree, i.e. an index. In one example embodiment, the sub ID is a predetermined number of least significant bits (LSB) of the tree ID, e.g., the 9 LSB of the tree ID. The most significant bits (MSB) of the tree ID are unique for the entire collective tree. Thus, a given CAU may actually represent multiple logical nodes in the same collective tree, each logical node having a different sub ID but the same MSB of the tree ID. This is particularly useful when a collective tree has many processors (root or leaves) and few CAUs (internal nodes), such that the small number of neighbors for a given CAU is insufficient to describe all of the processors attached to a CAU for a given collective tree. Note that if a tree ID does not have any node-specific bits, then it would not be possible to have multiple indexes within a CAU being part of the same collective tree.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a collective operation to distribute or collect data among a plurality of participant nodes, the method comprising:
   receiving, in a collective acceleration unit, an input collective packet for a collective operation from a neighbor node within a collective tree, wherein the input collective packet comprises a tree identifier and an input data field and wherein the collective tree comprises a plurality of sub trees;
   mapping, by the collective acceleration unit, the tree identifier to an index, wherein the index identifies a portion of resources within the collective acceleration unit and is associated with a set of neighbor nodes in a given sub tree within the collective tree, and wherein for each neighbor node the collective acceleration unit stores destination information; and
   performing, by the collective acceleration unit, an operation on the input data field using the portion of resources to effect the collective operation.

2. The method of claim 1, wherein mapping the tree identifier to the index comprises looking up the tree identifier in a content addressable memory.

3. The method of claim 1, wherein the portion of resources comprises an arithmetic logic unit and a portion of buffer space in the collective acceleration unit.

4. The method of claim 3, wherein performing the operation on the input data field comprises storing the input data field in the portion of buffer space for the index.

5. The method of claim 3, wherein performing the operation on the input data field comprises receiving a previous result data field from the portion of buffer space for the index associated with the collective operation and using the arithmetic logic unit to perform an arithmetic operation on the previous result data field and the input data field to form a current result data field and storing the current result data field in the portion of buffer space for the index.

6. The method of claim 1, further comprising:
   selecting a destination neighbor node from the set of neighbor nodes;

generating an output collective packet based on a result of the operation, wherein the output collective packet comprises destination information for the destination neighbor node; and sending the output collective packet to the destination neighbor node.

7. The method of claim 6, wherein selecting the destination neighbor node comprises:

setting a destination neighbor select value; and providing the destination neighbor select value to a first multiplexer, wherein the first multiplexer selects a sub identifier corresponding to the destination neighbor node; and providing the destination neighbor select value to a second multiplexer, wherein the second multiplexer selects a destination identifier corresponding to the destination neighbor node, wherein the destination information for the destination neighbor node comprises the selected sub identifier and the destination identifier corresponding to the destination neighbor node.

8. The method of claim 7, wherein the tree identifier comprises an inclusive portion that is unique for the collective tree and a sub tree portion that is unique for the index and wherein the sub tree portion comprises a sub identifier.

9. The method of claim 8, wherein generating the output collective packet comprises:

combining the inclusive portion of the tree identifier with the selected sub identifier to form a new tree identifier.

10. The method of claim 9, wherein generating the output collective packet comprises:

combining the new tree identifier, the selected destination identifier, and the result of the operation to form the output collective packet.

* * * * *